US006212758B1

(12) United States Patent
Baker et al.

(10) Patent No.: US 6,212,758 B1
(45) Date of Patent: Apr. 10, 2001

(54) WIRE TERMINATION TOOL HAVING AN IMPROVED IMPACT SHAFT

(75) Inventors: Frank P. Baker, Chatham, NJ (US); Richard L. Case, Omaha, NE (US); Jeff S. Kiersh, Glen Gardner, NJ (US)

(73) Assignee: Avaya Technology Corp., Miami Lakes, FL (US)

( * ) Notice: Subject to any disclaimer, the term of this patent is extended or adjusted under 35 U.S.C. 154(b) by 0 days.

(21) Appl. No.: 09/438,180

(22) Filed: Nov. 11, 1999

(51) Int. Cl.[7] ............................ B23P 19/02; H01R 43/00; B25D 11/00

(52) U.S. Cl. ............................ 29/566.4; 29/751; 173/203

(58) Field of Search .................................... 29/566.4, 758, 29/750, 751, 752, 203 P, 203 H, 753, 759, 760, 566.1; 173/203, 205, 206, 202, 126, 120

(56) References Cited

U.S. PATENT DOCUMENTS 1,798,082 * 3/1931 Grutzbach ............................ 173/203
2,976,608 * 3/1961 Busler .................................. 173/203
3,074,155 * 1/1963 Cootes et al. ........................ 173/203
3,172,204 * 3/1965 Frey ...................................... 30/367
3,279,044 * 10/1966 Roper ..................................... 29/758
3,685,594 * 8/1972 Koehler ................................ 173/120
3,810,288 * 5/1974 Caveney et al. .................... 29/203 P
4,164,812 * 8/1979 Dragisic ................................. 29/760
4,286,381 * 9/1981 Litehizer, Jr. .......................... 29/751
4,389,769 * 6/1983 Casey ..................................... 29/751
4,416,059 11/1983 Humphrey et al. .................... 29/751
4,431,062 * 2/1984 Wanner et al. ...................... 173/104
4,453,307 * 6/1984 Casey ..................................... 29/751
4,524,510 * 6/1985 Brandeau ............................... 29/751
4,527,328 * 7/1985 Moody et al. .......................... 29/758
4,532,691 * 8/1985 Brandeau ............................... 29/751
4,682,412 * 7/1987 Pfeffer ................................... 29/750
5,230,147 * 7/1993 Asaoka et al. ......................... 29/753
5,613,297 * 3/1997 Dvorak et al. ...................... 29/566.4
5,794,325 * 8/1998 Fallandy ............................. 29/566.4

* cited by examiner

*Primary Examiner*—William Briggs
(74) *Attorney, Agent, or Firm*—Duane, Morris & Heckscher LLP

(57) ABSTRACT

The present invention provides an impact shaft for use in a pneumatic wire termination tool. The tool has a handle, a pneumatically driven piston and a head frame for engaging and terminating a plurality of wires to a corresponding connector at the same time. The impact shaft includes a plurality of coaxially arranged cylindrical sections positioned end to end, including a dowel pin positioned at a first end and a head frame locator having the dowel pin projecting from a first end and an extension portion projecting from a second end. The dowel pin and the head frame locator are sized to operatively engage the head frame. A spring register portion includes a first end from which the extension portion projects, and also includes a plurality of facets arranged for engagement with a biased portion of the tool so as to maintain the rotational orientation of the impact shaft relative to the handle. An air barrel shaft projecting from a second end of the spring register is operatively engaged by the pneumatic wire termination tool.

14 Claims, 3 Drawing Sheets

WIRE TERMINATION TOOL HAVING AN IMPROVED IMPACT SHAFT

FIELD OF THE INVENTION

The present invention generally relates to application equipment used for the mass termination of wires, and more particularly to a tool for use in mass termination of wires in a telephone cross-connect system.

BACKGROUND OF THE INVENTION

Telephone cross-connect systems, e.g., the 110 connector system, are used to manage main cross-connect and horizontal administration fields in private premises telecommunications equipment. Applications of the 110 connector system have included general building, wiring, premises distribution systems, local area networks, and other private area network installations. The main cross-connect is typically located in an equipment room of a building, and provides termination and cross-connection of network interface equipment, switching equipment, processor equipment, and backbone (riser or campus) wiring. Horizontal cross-connect is typically located in the telecommunications closet of a commercial building, and provides termination and cross-connection of horizontal (to the work area) and backbone wiring. Cross-connects allow for easy administration of routing and rerouting common-equipment data circuits to various parts of a building or campus.

A prior art 110 cross-connect system includes a field-wired cable termination apparatus that is used to organize and administer cable/wiring installations. A typical 110 cross-connect system of the type known in the art includes a wiring block having a plurality of terminal blocks that are field terminated or pre-terminated during manufacture. Assemblies of such wiring blocks often require as many as nine hundred pairs of wires to be terminated. In order to terminate such a large number of wires cost effectively, various tools have been developed in the art for "mass termination" of wires.

For example, a 788H tool includes a five-pair impact tool which is capable of terminating five or more pairs of wires in one insertion stroke of the tool. The 788H mass termination tool has been used for simultaneously seating and trimming five pairs of conductors on an index strip of a wiring block, and for seating a 110C connecting block onto a wiring block for termination. Such prior art tools include a cylindrical handle with a removable head frame, which attaches to the handle with a twist and lock type engagement. The head includes a stuffer and a removable cut-off blade section which allows for replacement of a cutting blade. The stuffer and cut-off blade section are housed in removable the head frame through which the handle is engaged, via a through-bore or the like engagement feature. The removable cut-off blade section is also reversible to allow for seating conductors and for combining an insert/trim function at installation.

Some prior art tools that are similar to the 788H, such as the 788E, are powered by 120 volt alternating current based motors, and have an impact function that is activated by a trigger on a handle. These tools are often used in factory production and other large installations where it is not practical to use a manually activated tool, such as the 788H, because of repetitive motion injuries and speed of assembly. There has been a consistent problem in the art with such mass termination tools because of the large number of cycles required of the tool during operation. More particularly, manufacturing facilities that produce the 110 cross-connect system will manufacture approximately 10,000 preassembled 110-rack systems or more, per year. Such a manufacturing output equates to fifty million or more tool cycles for a 788-type tool at the manufacturing site. Components for such systems that are sold to outside assemblers often require in excess of thirty million tool cycles. Unfortunately, tools such as the 788, that are based on electromotive forces, have an average life span of about 1 week in a manufacturing environment. Such short life spans have required the rebuilding or replacement of tools frequently, at several hundred dollars cost per tool. This retooling produces frequent down time and high replacement costs, along with a concomitant increase in the cost of manufacturing.

There is a need for a high cycle, low cost mass termination tool adapted for use in connection with a 110 cross-connect system that is capable of extended life.

SUMMARY OF THE INVENTION

The present invention provides an impact shaft for use in a pneumatic wire termination tool. The preferred tool has a handle, a pneumatically driven piston and a head frame for engaging and terminating a plurality of wires to a corresponding connector at the same time. The impact shaft comprises a plurality of coaxially arranged cylindrical sections positioned end to end, including a dowel pin positioned at a first end and a head frame locator having the dowel pin projecting from a first end and an extension portion projecting from a second end, wherein the dowel pin and the head frame locator are sized to operatively engage the head frame. A spring register portion having a first end from which the extension portion projects, includes a plurality of facets arranged for engagement with a biased portion of the tool so as to maintain the rotational orientation of the impact shaft relative to the handle. An air barrel shaft projecting from a second end of the spring register is operatively engaged by the pneumatically driven piston.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

DETAILED DESCRIPTION OF THE PREFERRED EMBODIMENT

Figure 1:
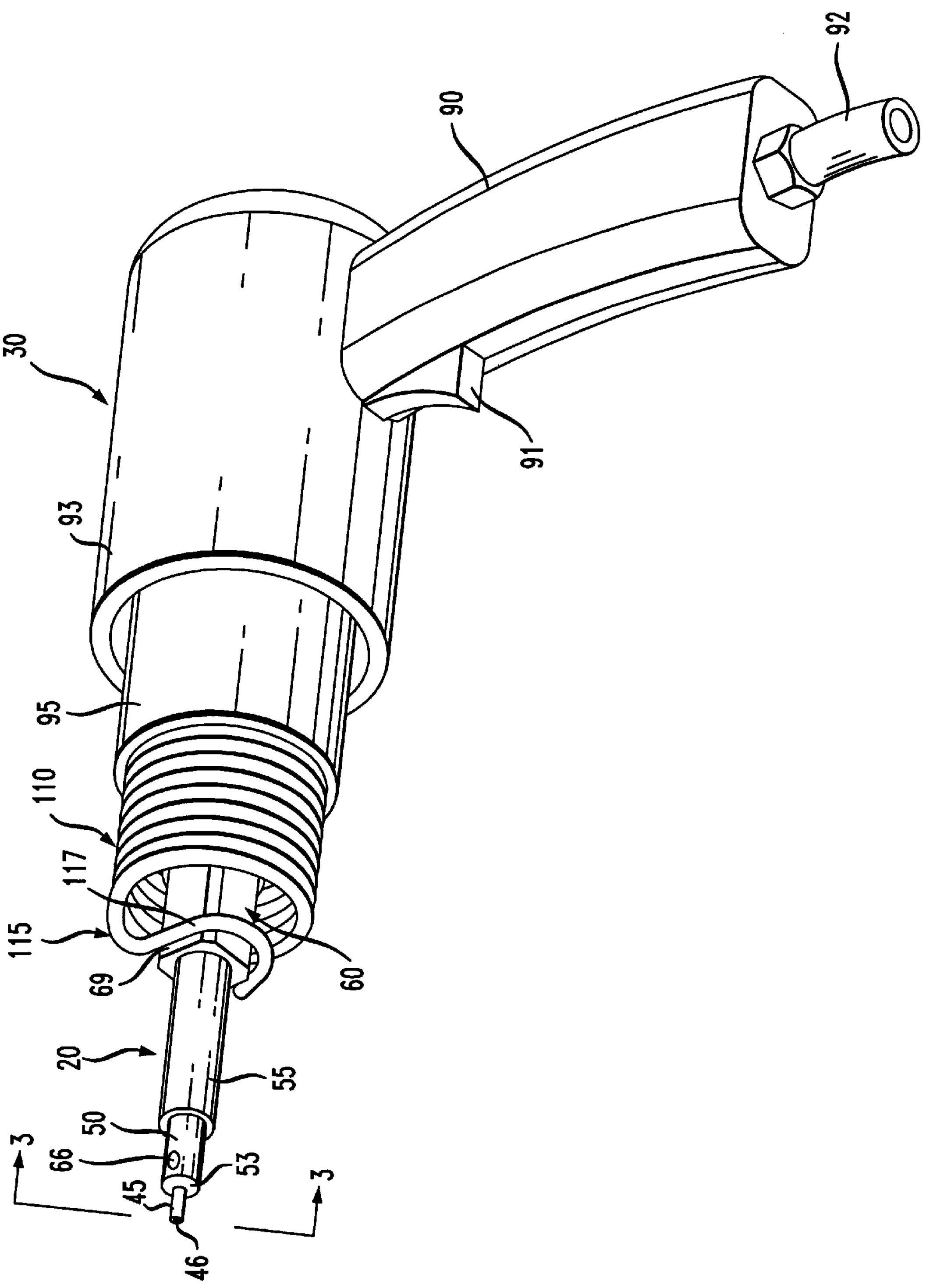
FIG. 1 is a perspective view of a mass-termination tool including an impact shaft formed in accordance with the present invention.

The following description of the preferred embodiments of the invention are intended to be read in connection with the foregoing drawings and are to be considered a portion of the entire written description of this invention. As used in the following description, terms such as, "horizonal", "vertical", "left", "right", "up", and "down", as well as adjectival and adverbial derivatives thereof (e.g., "horizontally", "rightwardly", "upwardly", etc.) simply refer to the orientation of the structure of the invention as it is illustrated in the particular drawing figure when that figure faces the reader. Similarly, the terms "inwardly" and "outwardly" generally refer to the orientation of a surface relative to its axis of elongation, or axis of rotation, as appropriate. Also, the terms "connected" and "interconnected," when used in this disclosure to describe the relationship between two or more structures, mean that such structures are secured or attached to each other either directly or indirectly through intervening structures, and include pivotal connections. The term "operatively connected" means that the foregoing direct or indirect connection between the structures allows such structures to operate as intended by virtue of such connection.

Referring to FIGS. 1–5, a 788 type mass termination tool formed in accordance with the present invention comprises an impact shaft 20 and an air tool handle 30. A termination head used in connection with a prior art 788E tool may be used with impact shaft 20, and typically includes a head frame (indicated generally by the reference numeral 21 in FIG. 4), a stuffer, and a removable cut-off blade section all of which are well known in the art and therefore not shown in the various figures.

Figure 2:
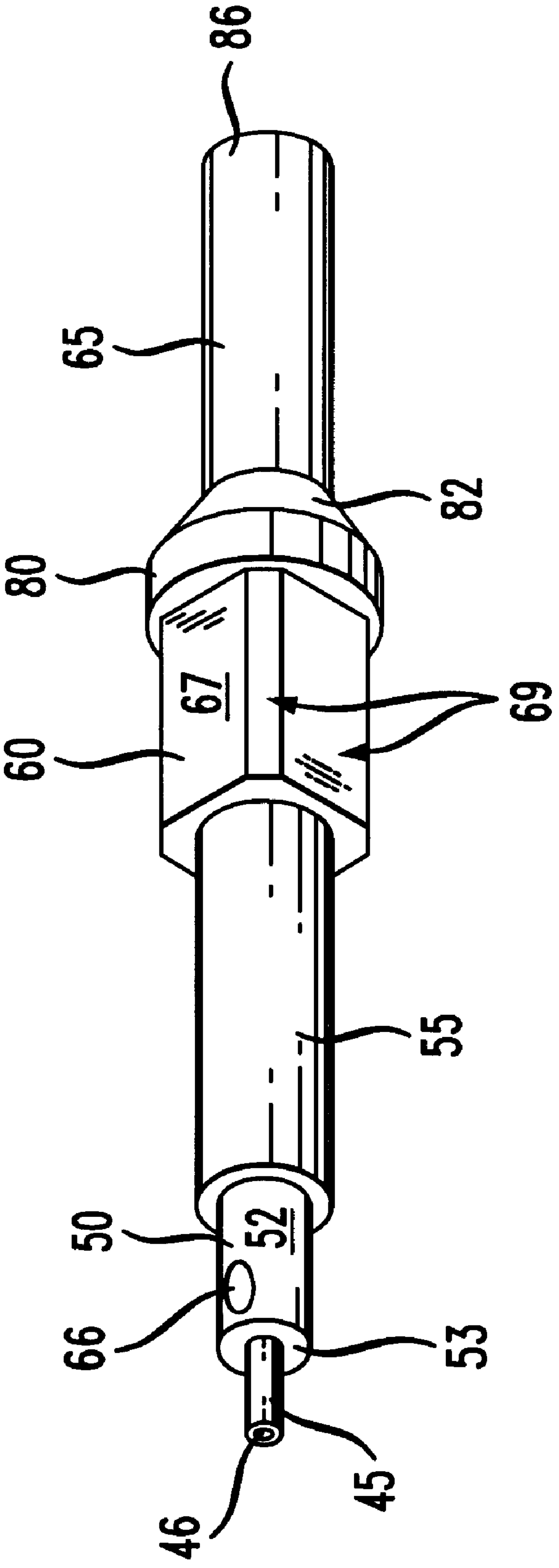
FIG. 2 is a perspective view of the impact shaft shown in FIG. 1.

Impact shaft 20 of the present invention is formed from a solid blank of tool steel, e.g., S7 tool steel hardened to Rockwell 50–52 C, and generally comprises a plurality of coaxially arranged cylindrical sections positioned end to end so as to form a shaft of varying cross-sectional diameter (FIG. 2). In one embodiment, impact shaft 20 includes a dowel or spring pin 45, a head frame locator 50, an extension 55, a spring register 60, and an air barrel shaft 65. Dowel or spring pin 45 projects outwardly from a central portion of head frame locator 50 at a first end of impact shaft 20. Dowel or spring pin 45 may include a central bore 46, and is sized and shaped to locate and engage a complementary feature on a removable cut-off blade (not shown), via a through-bore in the rear portion of a 788E head frame.

Head frame locator 50 projects outwardly from a central portion of extension 55, and is sized and shaped so as to be accepted within the through-bore in the rear portion of a head frame. Head frame locator 50 has a diameter that is smaller than extension 55, but larger than dowel or spring pin 45, and includes a ball detent 66 located on a side surface 52 which is spring loaded so that it will engage a corresponding feature within the through-bore of the head frame. A frustoconical taper 53 forms an intersection transition between head frame locator 50 and dowel or spring pin 45. Extension 55 projects outwardly from a central portion of spring register 60, and supports and positions head frame locator 50 and dowel or spring pin 45. Extension 55 has a diameter that is smaller than spring register 60, but larger than head frame locator 50, and is substantially circular in cross-section.

Spring register 60 projects outwardly from a central portion of air barrel shaft 65, and includes a faceted outer surface that defines a plurality of planar surfaces 69 (FIG. 2). Planar surfaces 69 form a polygonal cross-sectional profile which may be hexagonal or octagonal. Preferably, spring register 60 is formed having a rectangular or square cross-section, and then the corners are cut down so as to provide additional planar surfaces. Spring register 60 has a width that is larger than the diameter of extension 55 and air barrel shaft 65. An annular shoulder 80 is positioned at the intersection of spring register 60 and air barrel shaft 65, and has a diameter that is larger than the width of spring register 60. A frustoconical section 82 of annular shoulder 80 tapers toward air barrel shaft 65. Air barrel shaft 65 projects outwardly from the end of frustoconical section 82 of annular shoulder 80 to terminate at a rear end 86 of impact shaft 20. Air barrel shaft 65 has a substantially circular cross-section that is similar in diameter to extension 55, and may include a chamfer at rear end 86 to ease assembly to air tool handle 30.

Figure 3:
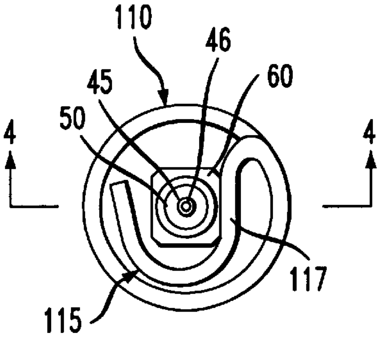
FIG. 3 is a top plan view of the mass-termination tool, including an impact shaft, as taken along line 3—3 in FIG. 1.
Figure 4:
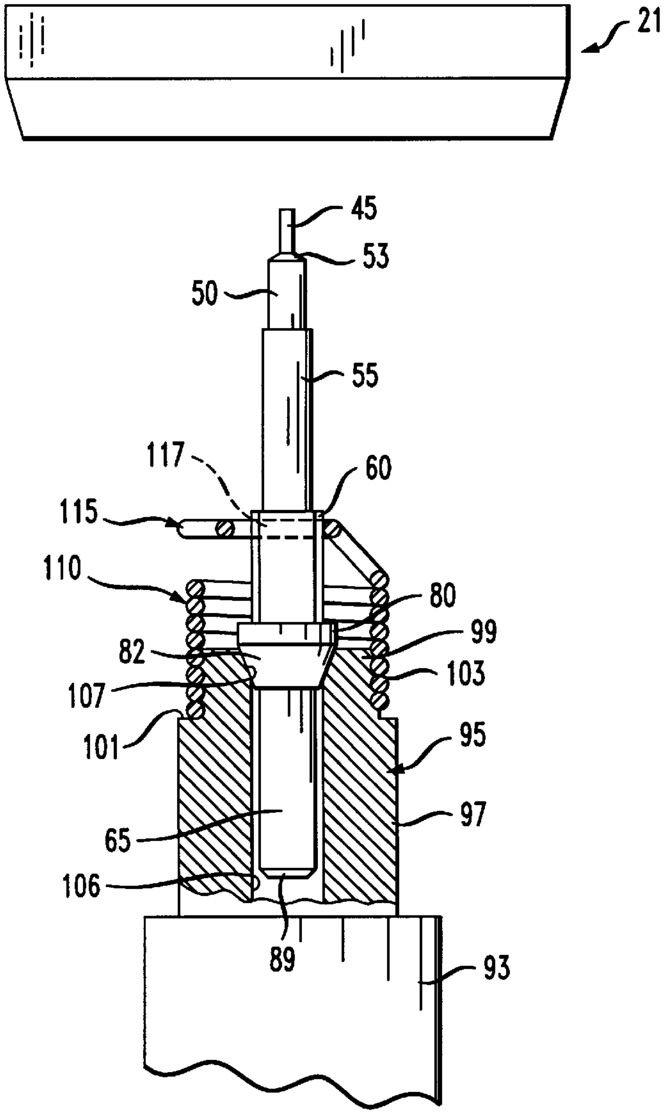
FIG. 4 is a side elevational view, partially in section and partially broken-way, of the impact shaft of the present invention assembled to a tool handle, as taken along line 4—4 in FIG. 3, and showing a general representation of a head frame used in connection with the invention.

Referring to FIGS. 1 and 3–5, air tool handle 30 is a pneumatically operated impact tool that comprises a pistol-style grip 90 including a trigger 91. An air input orifice 92 is located at the base of pistol-style grip 90, and communicates with a shaft engagement barrel 93, via a conventional pressurized air conduit (not shown) defined within air tool handle 30. An air valve actuated piston 95 is positioned in operative relation with the conventional pressurized air conduit, and projects outwardly from shaft engagement barrel 93. Air valve actuated piston 95 includes a first section 97, a second section 99, and a shoulder support 101 located at the intersection of first section 97 and second section 99. First section 97 has a larger diameter than second section 99, and the outer surface 103 of second section 99 is threaded. Air valve actuated piston 95 is assembled to an operative end of shaft engagement barrel 93, and includes a central bore 106 that defines a tapered counter-bore 107 that is sized and shaped to accept frustoconical section 82 of impact shaft 20 (FIG. 4).

A tension spring 110 is positioned in threaded coaxial relation to second section 99 of air valve actuated piston 95. Spring 110 is typically a helical tension spring having a substantially cylindrical cross-section that is similar in diameter to shoulder support 101 of air valve actuated piston 95. The coils of spring 110 are sized, shaped, and oriented so as to threadingly engage threaded outer surface 103 of second section 99. A terminal coil of spring 110 is bent back upon itself so that it extends outwardly from a terminal end of spring 110 to form an impact shaft engagement arm 115. Arm 115 includes a facet engagement section 117.

With spring 110 threaded onto outer surface 103 of second section 99, impact shaft 20 is assembled to air tool handle 30 by orienting the shaft so that rear end 86 is in confronting spaced relation to impact shaft engagement arm 115 and coaxially aligned with central bore 106. Once in this position, impact shaft 20 is moved toward air tool handle 30 so that rear end 86 enters central bore 106, via spring 110. Chamfer 89 aids in aligning impact shaft 20 with central bore 106. Impact shaft 20 continues to move toward air tool handle 30 until frustoconical section 82 of annular shoulder 80 engages the surface of tapered counter-bore 107.

In this position, facet engagement section 117 of impact shaft engagement arm 115 engages a planar surface 69 of faceted outer surface of spring register 60 (FIGS. 1, 3 and 4). In this way, the orientation of the head frame may be maintained during a mass termination operation, since impact shaft 20 will be prevented from rotation due to the engagement of facet engagement section 117 with planar surface 69. Often, the head frame must be reoriented, relative to air tool handle 30, to accommodate the operator's position or comfort. In order to alter the orientation of the head frame, impact shaft 20 is rotated so that a different planar surface 69 is engaged by facet engagement section 117, corresponding to a new orientation of the head frame. As a result of this construction, low duty cycle electric 788E mass termination tools may be replaced with high duty cycle air powered tools.

It is to be understood that the present invention is by no means limited only to the particular constructions herein disclosed and shown in the drawings, but also comprises any modifications or equivalents within the scope of the claims.

What is claimed is:

1. An impact shaft for use in a pneumatic wire termination tool having a handle, a pneumatically driven piston, and a head frame for engaging and terminating a plurality of wires to a corresponding connector at the same time, said impact shaft comprising:

a plurality of coaxially and integrally arranged substantially solid cylindrical sections positioned end to end wherein;

a head frame locator is formed by a first one of said cylindrical sections having a first end and a second end with a dowel pin projecting from said first end and an extension portion formed by a second one of said cylindrical sections projecting from said second end, and further wherein said dowel pin and said head frame locator are sized to operatively engage said head frame;

a spring register portion formed by a third one of said cylindrical sections having a first end and a second end from which said extension portion projects and including a plurality of facets arranged for engagement with a biased portion of a pneumatic wire termination tool so that (i) said impact shaft comprises a rotational orientation relative to said pneumatic wire termination tool, and by said engagement maintains said rotational orientation and wherein said biased portion of said pneumatic wire termination tool comprises a tension spring positioned on an operative end of said pneumatic wire termination tool and including a terminal coil that extends outwardly from a terminal end of said spring to form a spring register portion engagement arm having a facet engagement section; and an air barrel shaft formed by a fourth one of said cylindrical sections projecting from said second end of said spring register portion so as to be operatively engaged by said pneumatic wire termination tool.

2. An impact shaft according to claim 1 wherein said dowel pin projects outwardly from a central portion of said head frame locator and further wherein said dowel pin includes a central bore that is sized and shaped to locate and engage a portion of said head frame.

3. An impact shaft according to claim 1 wherein said head frame locator projects outwardly from a central portion of said extension portion, wherein said head frame locator has a diameter that is smaller than the diameter of said extension portion, but larger than the diameter of said dowel pin.

4. An impact shaft according to claim 3 wherein said head frame locator includes a ball detent located on a side surface.

5. An impact shaft according to claim 3 comprising a frustoconical taper at an intersection transition region located between said head frame locator and said dowel pin.

6. An impact shaft according to claim 3 wherein said extension portion supports and positions said head frame locator and said dowel pin, and has a diameter that is smaller than the diameter of said spring register portion, but larger than the diameter of said head frame locator and is substantially circular in cross-section.

7. An impact shaft according to claim 1 wherein an outer surface of said spring register portion defines a plurality of planar surfaces.

8. An impact shaft according to claim 7 wherein said planar surfaces form a polygonal cross-sectional profile.

9. An impact shaft according to claim 8 wherein said polygonal cross-sectional profile is hexagonal.

10. An impact shaft according to claim 8 wherein said polygonal cross-sectional profile is octagonal.

11. An impact shaft according to claim 8 wherein said spring register portion has a width that is larger than the diameters of said extension portion and said air barrel shaft.

12. An impact shaft according to claim 8 comprising an annular shoulder positioned at an intersection transition region located between said spring register portion and said air barrel shaft, wherein said annular shoulder has a diameter that is larger than the width of said spring register portion.

13. An impact shaft according to claim 12 wherein said annular shoulder includes a frustoconical section that tapers toward said air barrel shaft so that said air barrel shaft projects outwardly from an end of said frustoconical section to terminate at a rear end.

14. An impact shaft according to claim 1 wherein said facet engagement section of said spring register portion engagement arm engages at least one of said facets so as to maintain said rotational orientation of said head frame during said terminating of said plurality of wires to said corresponding connector at the same time.

* * * * *